United States Patent Office 3,461,986
Patented Aug. 19, 1969

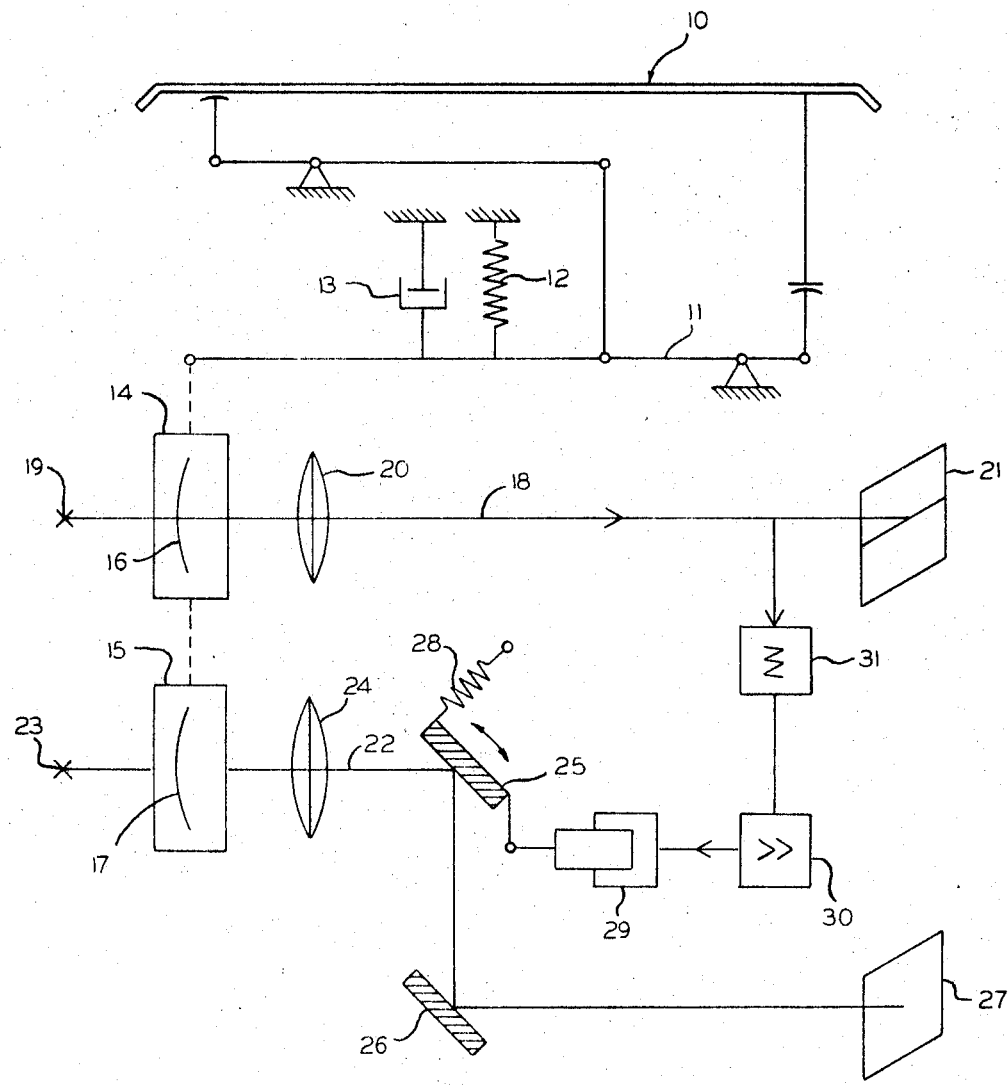

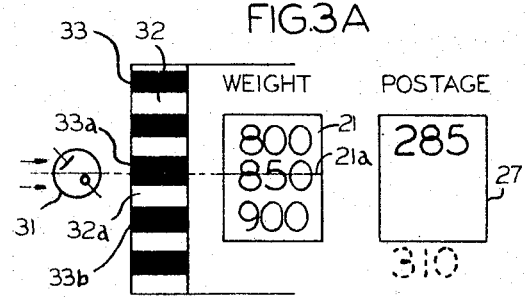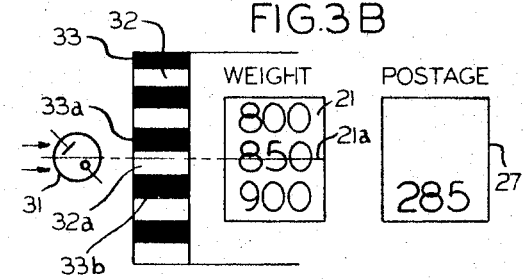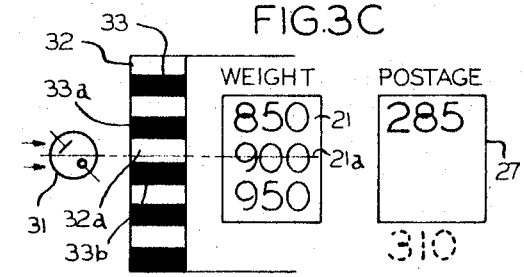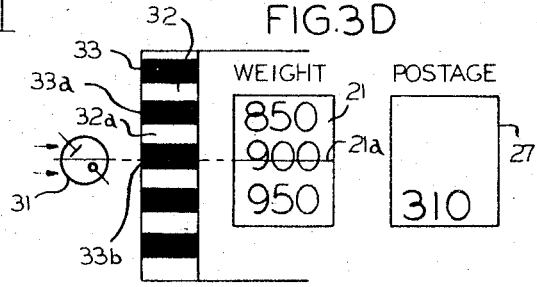

3,461,986
OPTICAL WEIGHING APPARATUS
Berend B. Schierbeek, Leidschendam, Netherlands, assignor to Maatschappij Van Berkel's Patent N.V., Rotterdam, Netherlands, a limited-liability company of the Netherlands
Filed Aug. 15, 1967, Ser. No. 660,705
Claims priority, application Netherlands, Aug. 22, 1966, 6611777
Int. Cl. G01g 23/32
U.S. Cl. 177—178                                   7 Claims

ABSTRACT OF THE DISCLOSURE

An optical weighing apparatus for postal use and the like including the optical projection of the weight and computed rate in decimal form where purely digital indication of the rate is provided.

---

This invention relates in general to weighing apparatus, and more particularly to weighing apparatus with optical projection where it is desired to have weight readout and computed rate readout, and more particularly to optical weighing apparatus for postal use and the like where weight and computed rate information may be read out upon weighing of postal matters or the like.

The application of optical means for price or rate indication is well known. Weighing scales have been heretofore developed, which after placing goods on a weighing platform and adjusting the desired weight per price, would allow immediate reading of the weight and computed price. Such a price computing or calculating scale has been generally provided with a chart, that may take the form of a translucent photographic plate on which the numbers to be projected have been suitably placed. There is always an arithmetical or geometrical relationship between these numbers, which relationship exists between weight, price per pound or kilogram, and computed price.

Postal rate charts differ from the usual rate charts for other goods, because the rate depends upon weight classes and rates which do not normally have an arithmetical or geometrical relationship. More specifically, a postal rate depends upon the distance over which the parcel is to be sent, the character of the parcel to be sent (letters, post cards, printed matters, small and large parcels), and the desired type of transportation (regular or air mail). There is no arithmetical relationship between these rates. Therefore, the application of a simple multiplication mechanism, that may be easily adjusted in the case of a rate change, is not possible for postal scales.

Yet the postal rates show a more simple pattern than the graduation of a price calculating scale, because the amounts to be paid vary per weight class, independently of the distance over which a parcel is to be sent.

For example:

| Parcel | Inland (ct.) | Germany (ct). | Australia (ct.) |
|---|---|---|---|
| Up to 3 kg | 180 | 240 | 565 |
| Up to 5 kg | 250 | 295 | 745 | while with a price calculating scale:

| Weight (kg.) | Price/kg. (ct.) | Price/kg. (ct.) | Price/kg. (ct.) |
|---|---|---|---|
| 1 | 100 | 200 | 500 |
| 3 | 300 | 600 | 1,500 |
|   |     | 602 | 1,505 |
|   | 302 | 604 | 1,510 |
|   | 304 |     |       |
|   | 496 |     |       |
|   | 498 | 996 | 2,490 |
|   |     | 998 | 2,495 |
| 5 | 500 | 1,000 | 2,500 |

Thus, it is clear that the spacing or pitch distance between subsequent rates or prices, not only depends upon the rate, but also on the rate per kilogram, and the division in the relevant rate column, which is sometimes standardized in one, two or five units or the tenfold thereof.

Accordingly, present optical rate indicating scales have a semidigital indication of the rates, that is, a continuous, succeeding series of numbers of which a choice must be made. Present weighing apparatus does not provide "purely digital" indication of the rate or price. "Purely digital," as used herein, means that one numerical rate will appear in the read-out window at any one time, thereby eliminating the need of making a choice from a series of numbers that would appear in a read-out window as in the case of the semidigital indication of rates.

The present invention encompasses an improvement of a postal scale in that is provides purely digital rate information on a frosted glass window from an easily changeable rate chart.

Optical means, applied in weighing apparatus with optical display, include generally:
 (1) Light sources.
 (2) A condensing system.
 (3) A graduation, comparable with a photographic slide, in the shape of: (a) a sector, for application in a pendulum scale, (b) a disc, situated revolvably and by means of a toothed rack driven by a pinion, (c) a rectangular plate that can be moved linearly.
 (4) An objective for the optical enlargement.
 (5) One or more mirrors for the reflection of light rays.
 (6) The frosted glass, on which numbers are projected.

These optical means are often provided in duplicate, that is, for the weight and rate indication. Furthermore, the objective of the rate or price indication is always movable and can be adjusted depending on the price per kilogram at a relevant part of the column of the graduation.

Preferably, a photoelectric or light sensitive circuit is used for the postal scale of the present invention which responds to the weight placed on the weighing platform and conditions the position of a mirror which reflects the projection of a numerical rate onto a frosted screen or read-out window. A changing in the rate chart position, in response to the weight on the platform, is detected by the mirror control circuit so that the mirror will take such a position that only one and the correct numerical rate appears fully in the read-out window.

According to the invention, one of the charts (weight or rate) includes a series of light and dark areas that coact with a photoelectric circuit. Since it is well known that postal rates may undergo change from time to time, it is preferable that rate chart may be easily exchanged, and therefore the rate chart would be separate from the weight chart. Then, changing of the rate chart would not require any special calibration of the weighing apparatus.

Accordingly, it is an object of the present invention to provide a new and improved optical weighing apparatus for postal use and the like.

Other objects, features and advantages of the invention will be apparent from the following detailed disclosure, taken in conjunction with the accompanying sheets of drawings, wherein like reference numerals refer to like parts, in which:

FIG. 1 is a diagrammatic view of the weighing apparatus according to the invention;

FIG. 2a is a fragmentary view of a single chart that includes the weight and the rate information, together with the light and dark areas for controlling the projection path of the rate information;

FIG. 2b is a fragmentary view of separate weight and rate charts that may be employed, wherein the light and drak areas for control of the projection path of the rate information are arranged on the weight chart; and FIG. 3a, FIG. 3b, FIG. 3c and FIG. 3d illustrate the operation of the present invention where the projection path of the rate information is varied in accordance with the position of the charts as controlled by the light and dark areas.

Referring now to the drawings, and particularly to FIG. 1, a diagrammatic showing of a spring scale is employed for illustrating the invention, although it can be appreciated that the invention might be applied to other types of scales, such as a pendulum scale. A weighing platform 10 is provided for receiving the goods to be weighed, and this platform rests on a lever system of the Beranger type. The lever system includes a lever 11 that coacts with a spring 12 and a damper 13. Chart holders 14 and 15 are also associated with the lever 11. A weight chart 16 is held by the chart holder 14, while a postage rate chart or the like 17 is held by the holder 15. Preferably the charts are supported by individual holders as illustrated so that the chart 17 may be easily replaced if there is established a revised set of postage rates. Further, the chart holders with the charts would operate and move together in response to movement of the lever 11. The charts may include a sheet of transparent material onto which the weights, rates and zones are etched, printed or otherwise placed. Where the charts are separate as illustrated, in the event of a rate change, it is not necessary to change the weight chart, and therefore not necessary to calibrate the weighing apparatus. However, it should be appreciated that a single chart including the weight and rates thereon, as illustrated in FIG. 2a, could be provided.

An image from the weight chart 16 is projected along a projection path 18 by a light source 19 arranged behind the chart, and an objective lens 20 arranged in front of the chart, and onto a weight read-out window 21 that may be of frosted glass.

Similarly, a projection path 22 for an image from the rate chart 17 is established by a light source 23 arranged behind the chart, an objective lens 24 arranged ahead of the chart and a projection path changing device including a movable mirror 25 and a fixed mirror 26. The projection path projects an image onto the rate read-out window 27 that may also be of frosted glass.

The movable mirror 25 is capable of moving between a first and second position, the first position being one the mirror is biased into by means of a spring 28, and the second position into which the mirror is driven by means of a solenoid or electromagnet 29. To accomplish the movement of the mirror, it can be appreciated that it may be pivotally mounted at the point of the projection path. Thus, an image is projected onto the mirror 25 which in turn projects the image onto the fixed mirror 26 which in turn projects it onto the read-out window 27.

The objective lens 24 is vertically movable, parallel to the surface of the chart 17, so that adjustment on the zone or the like desired for the rate chart may be possible.

The solenoid 29 is connected to the output of an amplifier 30, the input of which is connected to a light sensitive element 31. The light sensitive element 31 responds to the position of the charts, and particularly to the series of light and dark areas 32 and 33 that may be arranged on either chart but preferably on the weight chart. The light source 19, in this instance, would serve to direct a path of light toward the light and dark areas 32 and 33, which light path would be selectively allowed to strike and actuate the light sensitive element 31 or be blocked. The light sensitive element 31 may be a photocell or any other type of suitable unit. The mirror 25 upon moving between its first and second positions, will cause movement of the rate image about half a pitch distance, where the pitch distance is the distance between two adjacent numerical rates. It should be appreciated that the spacing between adjacent numerical rates on the rate chart, the size of the rate read-out window and the optical means for projecting an image onto the window are sized and correlated so that only one rate indicia can appear fully in the rate window 27 at any time. And as will be more clear hereinafter, it is only possible in the present invention that only one rate indicia will appear in the rate window at any one time, thereby providing a purely digital readout. With the present invention, it is not possible that part of one rate and part of another rate appear in the window at the same time.

As seen in FIG. 2b, the weight and rate charts 16 and 17, respectively, are shown separately, while a single chart for both rate and weight is illustrated in FIG. 2a and designated by the numeral 34. However, in either embodiment, the light and dark areas 32 and 33 are arranged adjacent the weight decimal data and in correlation therewith. The light and dark areas 32 and 33 may be considered a track or lattice which controls the operation of the projection path changing device for the projection path 22 of the rate indicia.

An example of operation of the present invention, with reference to FIGS. 3a, 3b and 3c and 3d will better enable understanding of the invention. In FIG. 3a, the numeral 850 is shown in the weight window 21 and closest to the center line 21a, while the numeral 285 is shown in the postage rate window 27 adjacent the upper end of the window. At the same time, a dark area 33a blocks the light path to the light sensitive element 31, thereby allowing the movable mirror 25 to remain in the first position as dictated by the biasing of spring 28. Note the postage numeral rate 310 in dotted lines outside the lower edge of the rate window 27 and which is the next highest rate for the next weight classification.

In FIG. 3b, while the weight is indicated as being slightly higher or slightly above 850, the blocking dark area 33a moves out of the path of light to the light sensitive element 31, thereby bringing into alignment with the light path the light area 32a and allowing activation of the light sensitive element 31. A signal is transmitted to the amplifier 30, the output of which causes actuation of the solenoid 29 and movement of the mirror 25 into its second position so that the postage rate numeral 285 is moved to the lower part of the postage rate window 27. Further increase in weight of the goods causes approaching of the limit 900 in the weight window 21 as shown in FIG. 3c, and movement of the postage rate to the upper end of the rate window 27. Inasmuch as the light path to the light sensitive element 31 is not interrupted, the position of the mirror 25 remains the same. Then upon interruption of the light path to the light sensitive element 31 by the dark area 33b, as seen in FIG. 3d, the mirror 25 is actuated to its return position to cause the postage rate numeral 310 to move into the area of the postage rate window 27 and thereby set up the next rate for the subsequent weight classification. Accordingly, only one rate will ever appear fully in the rate window 27 thereby giving purely digital indication.

While not shown, it can be appreciated that movement of the projection path can be accomplished by other devices such as a parallel plate that may be adjustably moved through any part of the projecting path to the rate window. Also rate chart that may be reproduced in duplicate together with a sliding objective lens may be employed where the objective lens may move to focally adjust on one of the image surfaces of the chart. Further, a sliding diaphragm could be mounted for operation immediately behind the rate window.

The rate changing apparatus may also be modified so that the numeral rate is positioned closer to the center of the rate window by duplicating the light sensitive element circuitry, by providing a movable mirror that would move through three positions, or by employing a double movable-fixed mirror arrangement. In such modifications, the movement of the numeral rate in the rate window during a change would be halved, thereby giving a better visual impression of the rate.

It should be appreciated that the light sensitive element circuitry is actuated only when the scale platform has reached equilibrium. Further, while the weight and rate charts illustrated are rectangular in shape, the movement in response to a weighing operation would be linear, but the charts would be disc-shaped or sector-shaped and movable along an arcuate path.

It will be understood that modifications and variations may be effected without departing from the scope of the novel concepts of the present invention.

The invention is hereby claimed as follows:

1. In an optical weighing apparatus, a device for reading out weight and computed rate data responsive to the weight of the goods weighed by said apparatus, said device comprising, a transparent weight chart having spaced decimal weight indicia thereon, a transparent rate chart having spaced decimal rate indicia thereon and being correlated to said weight chart, said charts movable together in response to the weight of goods, a weight read-out window, a rate read-out window, first optical means for projecting an image along a path from the weight chart to the weight window, second optical means for projecting an image along a path from the rate chart to the rate window, the spacing between adjacent rates on said rate chart and the size of the rate window being such that only one rate indicia can appear fully in the window at any time, said second optical means including means responsive to chart position for controlling the projection path thereof so that only one rate indicia appears fully in the rate window at any weighing position, said chart position responsive means including a light sensitive element, a light source directed thereto, a series of spaced light and dark areas on one of said charts between said source and element for operating the element and in correlation with the weight and rate indicia, and means operable by said element to shift the projection path at predetermined chart positions thereby maintaining only one rate indicia in the rate window.

2. In an optical weighing apparatus as defined by claim 1, wherein means is provided to independently mount said weight and rate charts and to permit easy exchangeability of said rate chart.

3. In an optical weighing apparatus as defined by claim 1, wherein said light and dark areas are on the weight chart.

4. In an optical weighing apparatus as defined by claim 1, wherein said windows include frosted glass.

5. In an optical weighing apparatus as defined by claim 1, wherein said projection path shifting means includes first and second mirrors in the projection path of said second optical means, one of which is movable and operable between first and second positions to alter the position of the projected image in the rate window.

6. In an optical weighing apparatus as defined in claim 5, wherein said movable mirror is pivotally mounted and spring biased to one position, and a solenoid operatively connected to said movable mirror to selectively drive it to said other position.

7. In an optical weighing apparatus as defined in claim 6, and an amplifier connected to said element at the input side and connected to said solenoid at the output side.

References Cited

UNITED STATES PATENTS

| 3,053,143 | 9/1962 | Meier | 177—178 X |
| 3,289,777 | 12/1966 | Willyard | 177—178 |

FOREIGN PATENTS

| 1,487,531 | 7/1967 | France. |

RICHARD B. WILKINSON, Primary Examiner

G. H. MILLER, Jr., Assistant Examiner

U.S. Cl. X.R.

353—40